United States Patent [19]

Shimazaki

[11] Patent Number: 4,938,448
[45] Date of Patent: Jul. 3, 1990

[54] MOUNTING MECHANISM FOR AN AUTOMOTIVE AIR CONDITIONING COMPRESSOR

[75] Inventor: Seiji Shimazaki, Isesaki, Japan
[73] Assignee: Sanden Corporation, Gunma, Japan
[21] Appl. No.: 244,109
[22] Filed: Sep. 14, 1988
[30] Foreign Application Priority Data Sep. 14, 1987 [JP] Japan .................... 62-140165[U]
Sep. 14, 1987 [JP] Japan .................... 62-140166[U]

[51] Int. Cl.⁵ .......................................... F16M 13/00
[52] U.S. Cl. ..................................... 248/635; 248/638; 267/141.2; 267/293
[58] Field of Search ............... 248/632, 635, 634, 630, 248/638; 267/141.2, 141.3, 141.4, 141.5, 293

[56] References Cited

U.S. PATENT DOCUMENTS

| | | |
|---|---|---|
| Re. 19,016 | 12/1933 | Whitehouse .................. 267/141.2 |
| 1,862,483 | 6/1932 | Lord . |
| 2,708,560 | 5/1955 | Paley ............................ 248/632 X |
| 3,030,101 | 4/1962 | McIntosh .................... 267/141.3 X |
| 3,476,309 | 11/1969 | Harlin . |
| 3,494,540 | 2/1970 | Dixon . |
| 3,813,776 | 6/1974 | Frederickson et al. . |
| 4,452,418 | 6/1984 | Urushihara et al. . |
| 4,600,367 | 7/1986 | Terauchi et al. . |
| 4,666,122 | 5/1987 | Goodard . |
| 4,762,310 | 8/1988 | Krajewski et al. ............ 267/293 X |

FOREIGN PATENT DOCUMENTS

| | | | |
|---|---|---|---|
| 733005 | 4/1966 | Canada ......................... 267/293 |
| 955900 | 11/1947 | France .......................... 248/635 |
| 57-61252 | 4/1982 | Japan . | |
| 402389 | 2/1932 | United Kingdom ............ 248/634 |

Primary Examiner—David L. Talbott
Attorney, Agent, or Firm—Banner, Birch, McKie & Beckett

[57] ABSTRACT

A mounting mechanism which directly connects a compressor of an automotive air conditioning system to an automobile engine. A flange portion projects from an outer peripheral surface of the compressor and bolt-nut mechanisms connect the flange portion of the compressor to the automobile engine. The flange portion has at least one first hole having a vibration absorbing coupling mechanism disposed therein. The coupling mechanism includes at least one cylindrical bushing which is fixedly disposed within the first hole and includes an outer cylinder, an inner cylinder and a vibroisolating rubber member which is fixedly disposed between the outer and inner cylinders by adhesion. At least two attaching members having cylindrical portions with holes for receiving a bolt-nut mechanism, are provided with bars which are securely inserted into the bushing inner cylinder.

10 Claims, 3 Drawing Sheets

MOUNTING MECHANISM FOR AN AUTOMOTIVE AIR CONDITIONING COMPRESSOR

TECHNICAL FIELD

This invention relates to a mounting mechanism for a compressor, and more particularly, to an improved mounting mechanism for directly connecting a compressor in an automotive air conditioning system to an automobile engine.

BACKGROUND OF THE INVENTION

It is well known to directly mount an automotive air conditioning compressor to an automobile engine. The normal mounting arrangement of this type of mounting mechanism comprises a plurality of mounting blocks which are formed on the housing of the compressor and a plurality of bolts of mount the compressor on the engine through holes in the mounting blocks.

Referring to FIG. 1, which illustrates the main portion of a conventional mounting mechanism, compressor 10 has mounting blocks 11 which are formed on the outer surface of the compressor housing. Each mounting block 11 includes hole 12, as shown in FIG. 3, which extends in a direction perpendicular to the longitudinal axis of compressor 10. A plurality of holes 20 are formed on the end portion of the engine 21 and are positioned to correspond to holes 12 of mounting blocks 11. To directly secure compressor 10 to engine 21, bolts 30 are inserted through spring washers 32, washers 31, and holes 12 and then screwed into threaded holes 20.

In such a mounting construction, compressor 10 and engine 21, both of which are formed of high strength material, are directly connected through a bolt-nut-like mechanism. Mechanical vibration, or more specifically, vibration in the axial direction of compressor 10 which is generated by compressor 10 during operation thereof, is transmitted from the compressor to the engine and then from the engine compartment to the passenger compartment of the automobile. As a result, the passenger compartment is subject to excess vibration and loud noise.

SUMMARY OF THE INVENTION

It is a primary object of the present invention to provide a mounting mechanism for an automotive air conditioning compressor which reduces the transmission of vibration produced by the compressor to an automobile engine, thereby preventing the production of objectionable vibration and noise in the passenger compartment.

A mounting mechanism in accordance with this invention includes a flange portion projecting from an outer peripheral surface of the compressor and bolt-nut mechanisms to connect the flange portion of the compressor to the automobile engine. The flange portion has at least one first hole and a vibration absorbing coupling mechanism including at least one cylindrical bushing which is fixedly disposed within the first hole. The bushing includes an outer cylinder, an inner cylinder and a vibroisolating rubber member which is fixedly disposed between the outer and inner cylinders by adhesion. When the first holes are formed to extend in a direction perpendicular to the longitudinal axis of the compressor, the bushing inner cylinder receives the bolt-nut mechanism. On the other hand, when the first holes are formed to extend in a direction parallel to the longitudinal axis of the compressor, the coupling mechanism further includes at least two attaching members for attaching the bushing to the bolt-nut mechanisms. Each attaching member includes a bar which is securedly inserted into the bushing inner cylinder and a cylindrical or tubular portion connected to said bar wherein said cylindrical or tubular portion includes a second hole for receiving the bolt-nut mechanism.

Further objects, features and other aspects of this invention will be understood from the following detailed description of the preferred embodiments of this invention with reference to the annexed drawings.

DETAILED DESCRIPTION OF THE PREFERRED EMBODIMENTS

Figure 1:
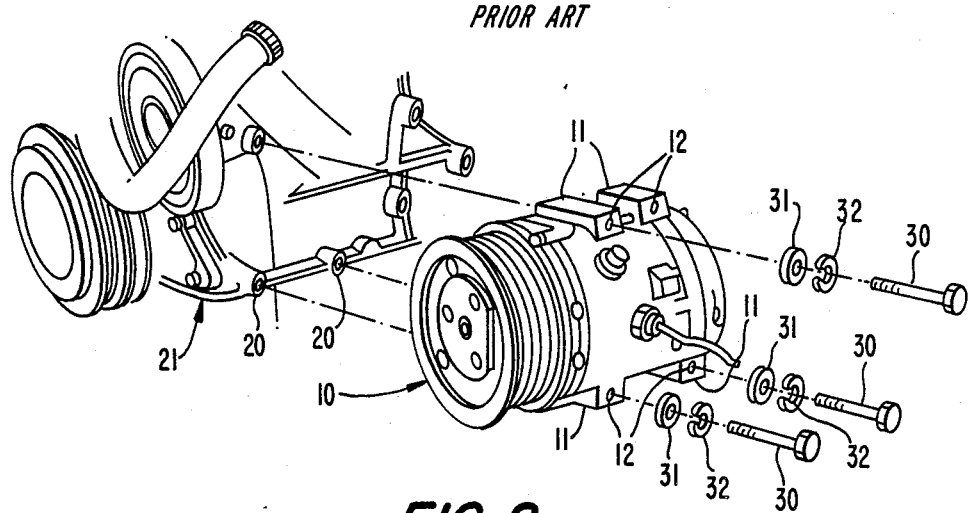
FIG. 1 is an exploded perspective view of a conventional mounting mechanism for a compressor in an automotive air conditioning system.
Figure 2:
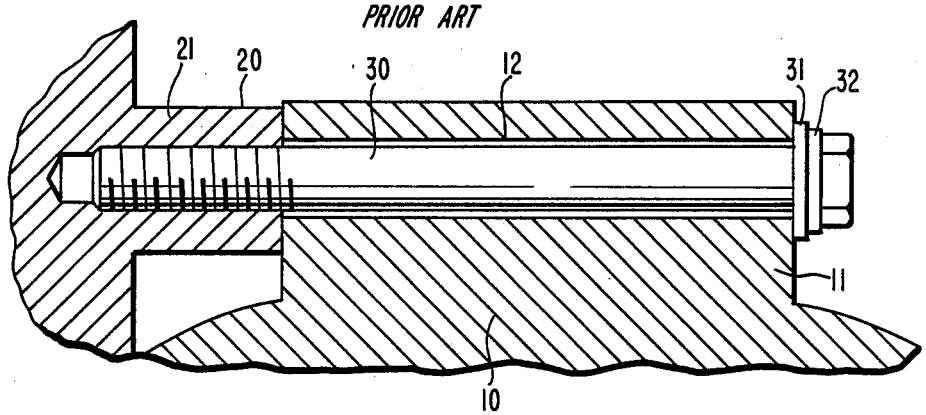
FIG. 2 is a cross-sectional view of a part of the mounting mechanism for the compressor in the automotive air conditioning system as shown in FIG. 1.
Figure 3:
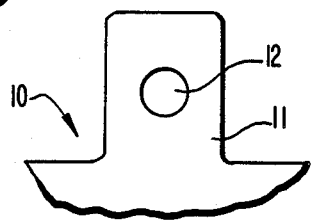
FIG. 3 is a front view of the compressor mounting block for the automotive air conditioning system as shown in FIGS. 1 and 2.

Referring to the drawings in detail, wherein like numerals indicate like elements, repeated description of like elements is omitted when its is appropriate is simplify the specification.

Figure 4:
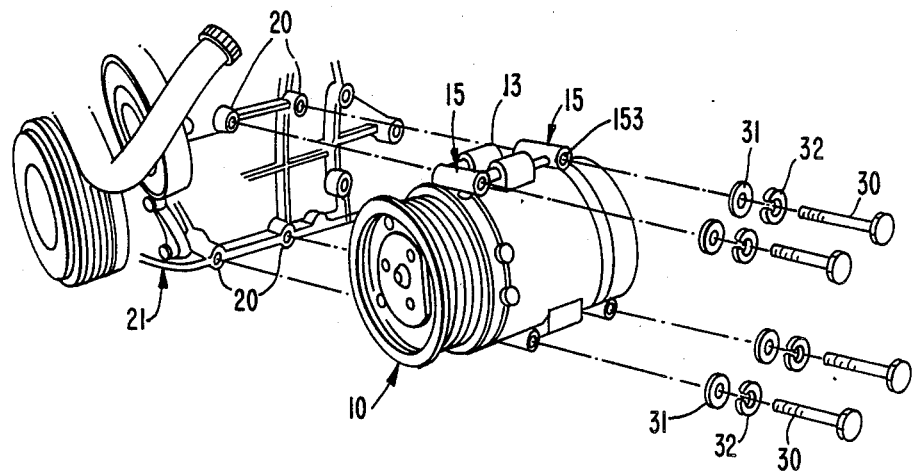
FIG. 4 is an exploded perspective view of a mounting mechanism for a compressor in an automotive air conditioning system in accordance with a preferred embodiment of the present invention.
Figure 5:
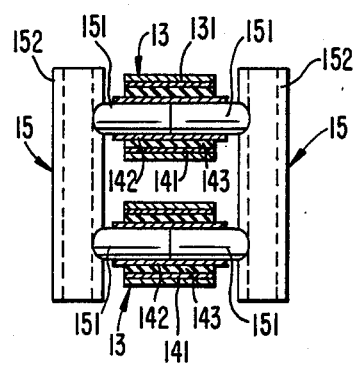
FIG. 5 is a cross-sectional plan view of a coupling mechanism for the mounting mechanism for a compressor in an automotive air conditioning system as shown in FIG. 4.
Figure 7:
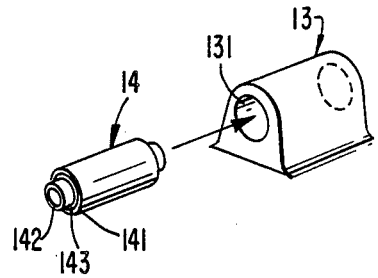
FIG. 7 is an enlarged perspective view of portion of the mounting mechanism depicting the cylindrical bushing of the coupling mechanism being inserted into the compressor flange.
Figure 6:
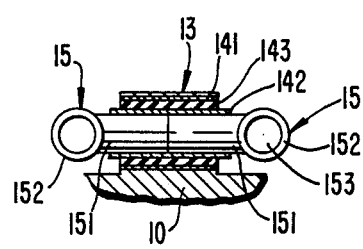
FIG. 6 is a side cross-sectional view of a coupling mechanism for the mounting mechanism for a compressor in an automotive air conditioning system as shown in FIG. 4.
Figure 8:
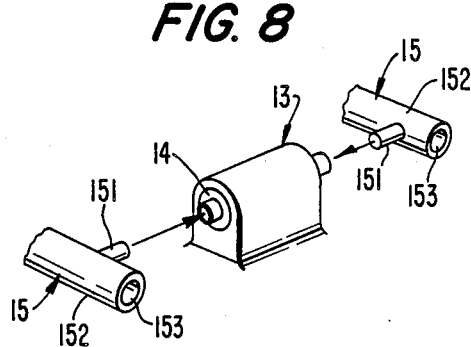
FIG. 8 is an enlarged perspective view of the coupling mechanism attaching member being attached to the coupling mechanism bushing.

Referring to FIGS. 4, 5 and 6, the construction of the mounting mechanism in the automotive air conditioning compressor in accordance with a first preferred embodiment of this invention is shown. A plurality of flange portions 13 are formed on the outer surface of compressor housing 10. Flange portions 13 have holes 131 which extend in a direction parallel to the longitudinal axis of compressor 10. One cylindrical bushing 14 is inserted into each hole 131, as shown in FIG. 7, so as to be fixedly disposed therein. Cylindrical bushing 14 comprises outer cylinder or sleeve 141, inner cylinder or sleeve 142 and vibroisolating rubber 143 disposed between outer and inner cylinders (or sleeves) 141 and 142 so as to connect both cylinders 141 and 142 by adhesion. Merely to exemplify a method for manufacturing the bushing, the following example may be recited. The rubber may be bonded to the inner and outer cylinders during the process of vulcanization of the rubber. As the rubber cools after vulcanization, it shrinks. The shrinkage places the rubber under tension. This process provides preferred results because rubber in tension has greater vibration absorption quality than rubber under compression.

One attaching member 15 is connected to each end of cylindrical bushing 14. Each attaching member 15 comprises bar 151 which is inserted into a given end of inner cylinder 142 and fixed therein. Cylindrical portions of tubular members 152 are connected to or integrally formed with an outer end of each bar 151. Cylindrical portions 152 of attaching members 15 extend in a direction perpendicular to the longitudinal axis of compressor 10 and include holes 153 to receive bolts 30. Compressor 10 is directly mounted on the end of engine 21 by screwing bolts 30 into threaded holes 20 after passing bolts 30 through washers 31, spring washers 32 and attachment member holes 153.

Figure 9:
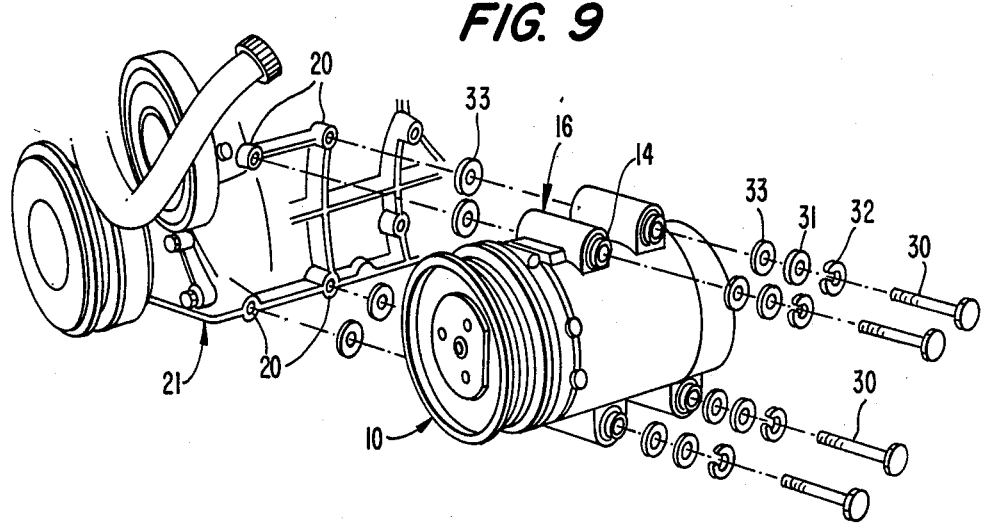
FIG. 9 is an exploded perspective view of a mounting mechanism for a compressor in an automotive air conditioning system in accordance with the second preferred embodiment of the present invention.
Figure 10:
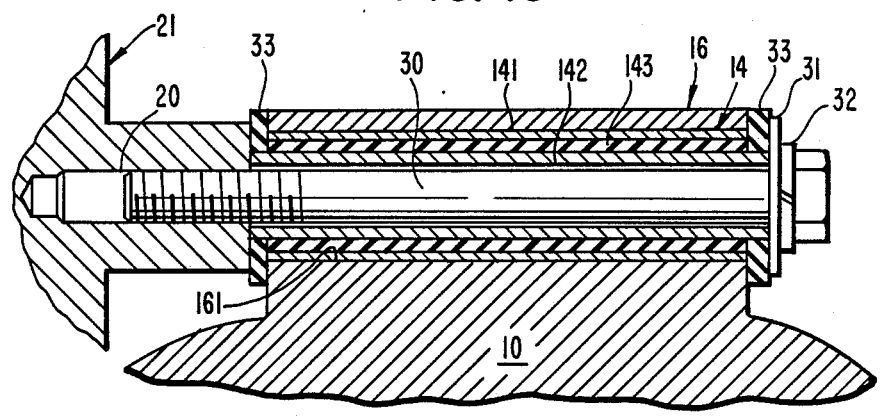
FIG. 10 is a cross-sectional view of a part of the mounting mechanism for the compressor in an automotive air conditioning system as shown in FIG. 9.

Referring to FIGS. 9 and 10, the construction of the mounting mechanism for the automotive air conditioning compressor in accordance with the second preferred embodiment of the present invention is shown.

Compressor 10 has flange portions 16 which are formed on the outer surface of the compressor housing. Flange portions 16 include holes 161 which extend in a direction perpendicular to the longitudinal axis of compressor 10. Cylindrical bushing 14 is inserted into each hole 161 and fixedly disposed therein. Cylindrical bushing 14, as described above, comprises outer cylinder 141, inner cylinder 142 and vibroisolating rubber 143 disposed between outer and inner cylinders 141 and 142 so as to connect both cylinders 141 and 142 by adhesion. Compressor 10 is securedly mounted on the end of engine 21 by screwing bolts 30 into holes 20 after passing bolts 30 through rubber washers 33, washers 31, spring washers 32 and inner cylinder 142.

Figure 11A:
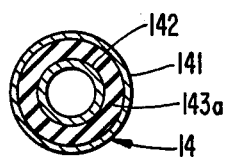
FIGS. 11(a), (b) and (c) are cross-sectional views of modified cylindrical bushings.
Figure 11B:
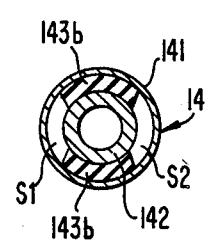
Figure 11C:
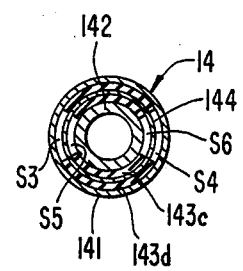

Referring to FIGS. 11(a), (b) and (c), modifications of cylindrical bushing 14 are shown. The cross-sectional shape of vibroisolating rubber 143a in FIG. 11(a) is formed to be ring-shaped (annular or tubular) so as to cover inner cylinder 142. Vibroisolating rubber 143b in FIG. 11(b) comprises two members which are diametrically disposed at the upper and lower portions of the inner cylinder, as shown in this Figure, and between inner and outer cylinders 141 and 142. A pair of longitudinal spaces s1 and s2 are formed in the right and left sides as depicted in FIG. 11(b), so that plate-shaped vibroisolating rubber strips 143b can be used instead of ring-shaped vibroisolating rubber 143a. Vibroisolating rubber 143c and 143d in FIG. 11(c) are independent from each other and are separated by intermediate cylinder 144. Inner longitudinal spaces s3 and s4, and outer longitudinal spaces s5 and s6, respectively, are formed between outer and inner cylinders 141 and 142.

This invention has been described in detail in connection with the preferred embodiment but those are examples only and the invention is not restricted thereto. It will be easily understood by those skilled in the art that variations and modifications can be easily made within the scope of this invention.

I claim:

1. In a mounting mechanism for directly mounting an automotive air conditioning compressor on an automobile engine including a flange portion projecting from an outer peripheral surface of the compressor and bolt-nut mechanisms connecting the flange portion of the compressor to the automobile engine, the improvement comprising:

said flange portion including a first hole having vibration absorbing coupling means fixedly disposed therein for coupling the flange portion to the bolt-nut mechanisms and absorbing compressor vibration;

said coupling means including a cylindrical bushing fixedly disposed in said first hole and attaching members for attaching said bushing to the bolt-nut mechanisms;

said cylindrical bushing comprising an outer cylinder, an inner cylinder and a vibroisolating rubber member fixedly disposed between said outer and inner cylinders and bonded thereto; and each attaching member including a bar inserted into said inner cylinder and a cylindrical portion connected to said bar wherein said cylindrical portion includes a second hole for receiving the bolt-nut mechanisms.

2. A mounting mechanism according to claim 1 wherein said vibroisolating member is ring-shaped.

3. A mounting mechanism according to claim 1 wherein said vibroisolating member comprises two separate strips diametrically disposed about said inner cylinder.

4. A mounting mechanism according to claim 1 wherein said vibroisolating member comprises two separate concentric strip pairs diametrically disposed about said inner cylinder, and each strip of a strip pair being separated from its corresponding strip by an intermediate shell disposed between said inner and outer cylinders.

5. A mounting mechanism as in any of claims 1, 2, 3 or 4 wherein said bolt-nut mechanisms comprise a rubber washer, a metal washer and a spring washer.

6. A mounting mechanism according to claim 1 further comprising a plurality of said flange portions each including said vibration absorbing coupling means fixedly disposed therein.

7. A mounting mechanism according to claim 6 wherein each vibroisolating member is ring-shaped.

8. A mounting mechanism according to claim 6 wherein each vibroisolating member comprises two separate strips diametrically disposed about said inner cylinder.

9. A mounting mechanism according to claim 6 wherein each vibroisolating member comprises two separate concentric strip pairs diametrically disposed about said inner cylinder, and each strip of a strip pair being separated from its corresponding strip by an intermediate shell disposed between said inner and outer cylinders.

10. A mounting mechanism as in any one of claims 6, 7, 8 or 9 wherein said bolt-nut mechanisms comprise a rubber washer, a metal washer or a spring washer.

* * * * *